(12) United States Patent
Ward et al.

(10) Patent No.: US 11,000,007 B2
(45) Date of Patent: May 11, 2021

(54) PET LITTER BOX (71) Applicant: Radio Systems Corporation, Knoxville, TN (US)

(72) Inventors: Eric Alexander Ward, Knoxville, TN (US); Jason Graves, Knoxville, TN (US); Ryan Anderson, Knoxville, TN (US); Robert A. Nytko, Knoxville, TN (US); Tina Ingersoll, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 136 days.

(21) Appl. No.: 16/003,900

(22) Filed: Jun. 8, 2018

(65) Prior Publication Data
US 2019/0373844 A1 Dec. 12, 2019

(51) Int. Cl.
*A01K 1/01* (2006.01)
(52) U.S. Cl.
CPC .................. *A01K 1/0107* (2013.01)
(58) Field of Classification Search
CPC .... A01K 1/015; A01K 1/0107; A01K 1/0114; A01K 1/0151
USPC ....... 119/161, 165, 452, 453, 472, 479, 480, 119/482, 496
See application file for complete search history.

(56) References Cited

U.S. PATENT DOCUMENTS

| | | |
|---|---|---|
| 627,535 A | 6/1899 | Joseph |
| 927,467 A | 7/1909 | Joel |
| 989,029 A | 4/1911 | Frederick |
| 1,192,415 A | 7/1916 | John |
| 1,211,762 A | 1/1917 | Sawyer et al. |
| 1,514,291 A | 11/1924 | Kimber |
| 1,671,051 A | 5/1928 | Soderquist |
| 2,144,329 A | 1/1939 | Conlon et al. |

(Continued)

FOREIGN PATENT DOCUMENTS

| | | |
|---|---|---|
| AU | 309573 S | 9/2006 |
| CA | 2069517 A1 | 11/1993 |

(Continued)

OTHER PUBLICATIONS

Dog potty by Patio Park, Inc., website located at www.patiopark.com/index.htm, accessed on Jan. 29, 2007, 3 pages.

(Continued)

*Primary Examiner* — David J Parsley
*Assistant Examiner* — Danielle A Clerkley
(74) *Attorney, Agent, or Firm* — Baker Donelson (57) ABSTRACT

A pet litter box (10) includes a housing (12) having a base portion (14), a grid portion (16), and a top portion (18). The base portion has a floor (20) and a raised, peripheral ledge (22) with a vertical wall (28) and a horizontal wall (30). The pet litter box has a removable tray (40). The horizontal wall includes air vents (56). Each air vent has an upwardly extending hood (58) having a rear wall (60), two oppositely disposed end walls (62) which define an outwardly facing air outlet opening (64). Each side air outlet opening is in fluid communication with a bottom air inlet opening (66) extending through the ledge horizontal wall. The air inlet opening is in fluid communication with ambient air external of the litter box. The grid portion 16 has a generally flat floor (72) with a grid of holes (74) there through.

17 Claims, 6 Drawing Sheets

(56) References Cited

U.S. PATENT DOCUMENTS

| | | |
|---|---|---|
| 2,390,854 A | 12/1945 | Thompson |
| 2,789,531 A | 4/1957 | Diefendorf |
| 2,971,493 A | 2/1961 | Robb et al. |
| 3,401,863 A | 9/1968 | Earl |
| 3,734,057 A | 5/1973 | Lee et al. |
| 3,745,975 A | 7/1973 | Prucha |
| 3,752,120 A | 8/1973 | Pallesi et al. |
| 3,752,121 A | 8/1973 | Brazzell |
| 3,793,988 A | 2/1974 | Traeger |
| 3,811,410 A | 5/1974 | Roberts |
| 3,818,865 A | 6/1974 | Sinclair |
| 3,827,401 A | 8/1974 | Franzl |
| 3,848,568 A | 11/1974 | Hazen et al. |
| 3,890,931 A | 6/1975 | Saver |
| 3,954,086 A | 5/1976 | Maness |
| 3,976,195 A | 8/1976 | Cohen |
| 3,990,397 A | 11/1976 | Lowe, Jr. |
| 4,011,836 A | 3/1977 | Temel |
| 4,011,837 A | 3/1977 | Ksioszk |
| 4,020,156 A | 4/1977 | Murray et al. |
| 4,027,625 A | 6/1977 | Wheeler |
| D245,191 S | 7/1977 | Gore |
| 4,050,414 A | 9/1977 | Knochel et al. |
| 4,067,297 A | 1/1978 | Johnson |
| 4,078,368 A | 3/1978 | Binder |
| 4,096,827 A | 6/1978 | Cotter |
| 4,098,229 A | 7/1978 | Haynes et al. |
| 4,117,804 A | 10/1978 | Moore et al. |
| 4,120,264 A | 10/1978 | Carter |
| 4,171,680 A | 10/1979 | Rhodes et al. |
| 4,190,525 A | 2/1980 | Menzel |
| 4,193,624 A | 3/1980 | Kerr |
| 4,256,056 A | 3/1981 | Sou |
| 4,271,787 A | 6/1981 | Wellman et al. |
| 4,284,273 A | 8/1981 | Gansewig |
| 4,308,759 A | 1/1982 | Sobotta |
| 4,325,325 A | 4/1982 | Larter |
| 4,325,822 A | 4/1982 | Miller |
| 4,359,966 A | 11/1982 | Casino et al. |
| 4,444,148 A | 4/1984 | Lander |
| 4,502,413 A | 3/1985 | Ponce et al. |
| 4,527,512 A | 7/1985 | Sugiura |
| 4,574,735 A | 3/1986 | Hohenstein |
| 4,627,383 A | 12/1986 | Metzger |
| 4,646,684 A | 3/1987 | Embry |
| 4,649,578 A | 3/1987 | Vargo |
| 4,658,720 A | 4/1987 | Massonnet |
| 4,711,198 A | 12/1987 | Mossbarger |
| 4,729,342 A | 3/1988 | Loctin |
| 4,763,606 A | 8/1988 | Ondrasik, II |
| 4,779,510 A | 10/1988 | Van Den Abbeel |
| 4,780,824 A | 10/1988 | Niwa et al. |
| 4,803,951 A | 2/1989 | Davis |
| 4,838,204 A | 6/1989 | Young |
| 4,844,011 A | 7/1989 | Strickland |
| 4,846,104 A | 7/1989 | Pierson, Jr. |
| 4,854,267 A | 8/1989 | Morrow |
| 4,862,830 A | 9/1989 | Michael |
| 4,869,206 A | 9/1989 | Spina |
| 4,870,924 A | 10/1989 | Wolfe et al. |
| 4,879,741 A | 11/1989 | Liu |
| D308,589 S | 6/1990 | Shay |
| 4,934,317 A | 6/1990 | Pourshalchi |
| 4,949,672 A | 8/1990 | Ratcliff et al. |
| 4,949,673 A | 8/1990 | Yamamoto |
| D310,740 S | 9/1990 | Mannschreck |
| 4,979,469 A | 12/1990 | Clark |
| 4,998,504 A | 3/1991 | Ball |
| 5,027,611 A | 7/1991 | Doi et al. |
| 5,044,325 A * | 9/1991 | Miksitz ................ A01K 1/0107 119/165 |
| 5,048,463 A | 9/1991 | Wilson et al. |
| 5,048,465 A | 9/1991 | Carlisi |
| 5,107,797 A | 4/1992 | Laroche |
| 5,111,771 A | 5/1992 | Mathews |
| 5,148,771 A | 9/1992 | Schuett et al. |
| 5,184,575 A | 2/1993 | Reinartz |
| 5,188,062 A | 2/1993 | Joy et al. |
| 5,226,388 A | 7/1993 | McDaniel |
| 5,249,549 A | 10/1993 | Rockaitis, III |
| 5,259,340 A | 11/1993 | Arbogast |
| 5,267,530 A | 12/1993 | Zamoyski |
| 5,272,999 A | 12/1993 | Nussle |
| 5,279,258 A | 1/1994 | Kakuta |
| 5,282,542 A | 2/1994 | Mo |
| D347,304 S | 5/1994 | Hellem |
| 5,329,644 A | 7/1994 | Scott |
| 5,337,700 A | 8/1994 | Toft |
| 5,353,743 A | 10/1994 | Walton |
| 5,355,837 A | 10/1994 | Reyes |
| 5,372,095 A | 12/1994 | Dowling et al. |
| 5,452,681 A | 9/1995 | Ho |
| 5,458,090 A | 10/1995 | Favreau |
| 5,473,306 A | 12/1995 | Adell |
| 5,477,812 A | 12/1995 | Waters |
| 5,494,001 A | 2/1996 | Leibowitz |
| 5,511,513 A | 4/1996 | Baron et al. |
| 5,544,620 A | 8/1996 | Sarkissian |
| 5,551,371 A | 9/1996 | Markey et al. |
| 5,564,364 A * | 10/1996 | Kovacs ................ A01K 1/0107 119/163 |
| 5,566,640 A | 10/1996 | Krumrei et al. |
| 5,579,722 A | 12/1996 | Yamamoto et al. |
| 5,592,900 A | 1/1997 | Kakuta |
| D382,374 S | 8/1997 | Burks |
| 5,669,331 A | 9/1997 | Richmond |
| 5,699,754 A | 12/1997 | Cahajla |
| 5,724,916 A | 3/1998 | Brodie et al. |
| 5,749,318 A | 5/1998 | Barbot et al. |
| 5,845,970 A | 12/1998 | Schwartz |
| 5,890,452 A | 4/1999 | Lundeen et al. |
| 5,931,119 A | 8/1999 | Nissim et al. |
| 5,931,326 A | 8/1999 | Weng |
| 5,934,223 A | 8/1999 | Ellery-Guy |
| 5,943,982 A | 8/1999 | Askins et al. |
| 5,960,744 A | 10/1999 | Rutman |
| 5,967,090 A | 10/1999 | Hui |
| 5,983,832 A | 11/1999 | Seo |
| 6,062,169 A | 5/2000 | Wade et al. |
| 6,065,429 A | 5/2000 | Crosse |
| D426,684 S | 6/2000 | Kenney |
| 6,079,363 A | 6/2000 | MacLaine et al. |
| D427,730 S | 7/2000 | Powers |
| 6,082,302 A | 7/2000 | Thaler et al. |
| RE36,847 E | 9/2000 | Waters |
| 6,129,050 A | 10/2000 | Carbajal |
| 6,131,534 A | 10/2000 | Axelrod |
| 6,192,834 B1 | 2/2001 | Kolozsvari |
| 6,202,585 B1 | 3/2001 | Alan |
| 6,202,595 B1 | 3/2001 | Atcravi |
| 6,205,953 B1 | 3/2001 | Ginn |
| 6,205,954 B1 | 3/2001 | Bogaerts |
| 6,230,915 B1 | 5/2001 | Liu |
| 6,237,534 B1 * | 5/2001 | Schwartz ............. A01K 1/0107 119/165 |
| 6,286,458 B1 | 9/2001 | Rawson |
| 6,298,808 B1 | 10/2001 | Crafton et al. |
| 6,318,294 B1 | 11/2001 | Richmond et al. |
| 6,332,429 B1 | 12/2001 | Gramlich |
| 6,354,245 B1 | 3/2002 | Roddy et al. |
| 6,367,420 B1 | 4/2002 | Tomlinson |
| 6,378,461 B1 | 4/2002 | Thaler et al. |
| 6,408,790 B1 | 6/2002 | Maguire |
| 6,412,442 B1 | 7/2002 | Bean |
| 6,453,844 B1 | 9/2002 | Janzen et al. |
| D467,041 S | 12/2002 | Cortes-Reuter |
| 6,523,495 B1 | 2/2003 | Rydman |
| D473,351 S | 4/2003 | Critchley |
| 6,550,426 B2 | 4/2003 | Tsengas |
| 6,568,348 B1 | 5/2003 | Bedard |
| 6,588,369 B2 | 7/2003 | Carlisi |
| 6,591,785 B1 | 7/2003 | Boshears et al. |
| 6,601,723 B1 | 8/2003 | Ziglar |
| 6,615,765 B1 | 9/2003 | Thomas |

(56) References Cited

U.S. PATENT DOCUMENTS

| | | |
|---|---|---|
| 6,626,129 B2 | 9/2003 | Schrader |
| 6,640,750 B2 | 11/2003 | Rowe et al. |
| D483,156 S | 12/2003 | Simpson |
| 6,701,868 B1 | 3/2004 | Shepherd |
| 6,701,872 B1 | 3/2004 | Allen |
| D491,700 S | 6/2004 | Abajian |
| 6,802,281 B2 | 10/2004 | Otsuji et al. |
| 6,845,604 B1 | 1/2005 | MacGregor |
| D501,584 S | 2/2005 | Abajian |
| 6,848,394 B1 | 2/2005 | Sexton |
| 6,851,386 B2 | 2/2005 | Northrop et al. |
| 6,863,026 B2 | 3/2005 | Northrop et al. |
| 6,892,670 B2 | 5/2005 | Northrop et al. |
| 6,898,909 B2 | 5/2005 | Sala |
| 6,951,190 B2 | 10/2005 | Northrop et al. |
| 6,994,054 B2 | 2/2006 | Matsuo et al. |
| 7,017,519 B1 | 3/2006 | Deasy et al. |
| 7,096,823 B1 | 8/2006 | Smeltzer |
| 7,096,824 B1 | 8/2006 | Deasy |
| 7,107,933 B2 | 9/2006 | Mohr |
| 7,137,355 B1 | 11/2006 | Wan |
| 7,263,951 B2 | 9/2007 | Gillis et al. |
| 7,395,784 B2 | 7/2008 | Hirokawa et al. |
| 7,434,539 B2 | 10/2008 | Gloor |
| 7,621,233 B2 | 11/2009 | Dukes et al. |
| 7,762,213 B2 | 7/2010 | Cook et al. |
| 7,997,230 B2 | 8/2011 | Cook et al. |
| 8,028,659 B2 | 10/2011 | Cook et al. |
| 8,161,908 B2 | 4/2012 | Cook et al. |
| D659,305 S | 5/2012 | Song et al. |
| 8,166,918 B2 | 5/2012 | Cook et al. |
| 8,166,919 B2 | 5/2012 | Cook et al. |
| 8,166,920 B2 | 5/2012 | Cook et al. |
| 8,328,368 B2 | 12/2012 | Luciano |
| 8,347,823 B1 | 1/2013 | Thomas et al. |
| 10,477,831 B2 * | 11/2019 | Beaudoin ............. A01K 1/0107 |
| 2002/0134314 A1 | 9/2002 | Carlisi |
| 2003/0217700 A1 | 11/2003 | Northrop et al. |
| 2004/0011297 A1 | 1/2004 | Hochman |
| 2004/0129233 A1 | 7/2004 | Northrop et al. |
| 2005/0284390 A1 | 12/2005 | Gillis et al. |
| 2005/0284392 A1 | 12/2005 | Hillman |
| 2006/0081191 A1 | 4/2006 | Deasy et al. |
| 2007/0039556 A1 | 2/2007 | Cook et al. |
| 2008/0251026 A1 | 10/2008 | Bell et al. |
| 2009/0288610 A1 | 11/2009 | Casiana |
| 2010/0050951 A1 | 3/2010 | Maguire et al. |
| 2012/0298049 A1 | 11/2012 | Cook et al. |
| 2013/0081577 A1 | 4/2013 | Morris |
| 2014/0069342 A1 * | 3/2014 | Khalili ................. A01K 1/0114 119/165 |

FOREIGN PATENT DOCUMENTS

| | | |
|---|---|---|
| CA | 2301362 A1 | 9/2001 |
| CA | 2428856 A1 | 11/2004 |
| DE | 2625957 A1 | 12/1977 |
| DE | 29902813 U1 | 6/1999 |
| EP | 0154540 A2 | 9/1985 |
| EP | 0227155 A2 | 7/1987 |
| EP | 0297015 A1 | 12/1988 |
| FR | 2842700 A1 | 1/2004 |
| FR | 2873263 A1 | 1/2006 |
| GB | 2238296 A | 5/1991 |
| JP | H0681245 U | 11/1994 |
| JP | H10323139 A | 12/1998 |
| JP | 2004313114 A | 11/2004 |
| JP | 2005176720 A | 7/2005 |
| JP | 2006000102 A | 1/2006 |
| WO | WO-0209502 A1 | 2/2002 |
| WO | WO-2005029948 A2 | 4/2005 |
| WO | WO-2005029948 A3 | 2/2006 |
| WO | WO-2006011983 A2 | 2/2006 |
| WO | WO-2008089011 A2 | 7/2008 |

OTHER PUBLICATIONS

Dog Potty by Pooch Potty, website located at www.poochpotty.com, accessed on Jan. 29, 2007, 3 pages.
Featuring Partial View of Doggy Dunny Toilet in Bottom Left Hand Corner, http://www.urbananimal.net/advertisers/issue12/piginmud.jpg, Aug. 16, 2007, 1 page.
In the Company of Dogs, Spring Preview 2001—Catalog, Portland, Tennessee, 2001, 49 pages.
Indoor Dog Potty by the Cosmopolitan Canine, website located at www.cosmopolitancanine.com/products.htm, accessed on Jan. 29, 2007, 2 pages.
Indoor Dog Potty by Wizdog, website located at www.wizdog.net, accessed on Jan. 29, 2007, 2 pages.
International Preliminary Report on Patentability for International Application No. PCT/AU2007/000748, Form PCT/IB/373, dated Sep. 30, 2008, 1 page.
International Search Report and Written Opinion for Application No. PCT/US2012/041754 dated Nov. 23, 2012, 7 pages.
International Search Report for International Application No. PCT/AU2007/000748, Form PCT/ISA/220 dated Jul. 19, 2007, 4 pages.
Machine Translation for Japanese Application No. JP10323139A dated Dec. 8, 1998, 12 pages.
Pet Patio Potty by Doggy Solutions, website located at wwwdoggysoutions.com/doglitterbox.htm, accessed on Jan. 29, 2007, 2 pages.
Peta Potty, http://www.petapotty.com, accessed on Jun. 5, 2014, 1 page.
Peta Potty, http://www.petapotty.com/faq.html, accessed on Mar. 13, 2007, 1 page.
Peta Potty, http://www.petapotty.com/home.html, accessed on Feb. 27, 2007, 9 pages.
Peta Potty, http://www.petapotty.com/original.htm, accessed on Jun. 5, 2014, 1 page.
Tail Wagging Pet Products to Keep your Pets Safe, http://adelaidevet.com.au/news/tail-wagging-pet-products-to-keep-your-pets-safe, accessed on Jun. 5, 2014, 3 pages.
The Pet Loo by Critter Cottage, website located at www.crittercottage.com.au/product.aspx?id=119, accessed on Jan. 29, 2007, 3 pages.
The Pet Potty, website located at www.thepetpotty.net, accessed on Jan. 29, 2007, 16 pages.
Website featuring "New Products, Pup-Head Portable Doggy Dunny" in upper left hand corner, date unknown, 1 page.
Written Opinion for International Application No. PCT/AU2007/000748, Form PCT/ISA/237 dated Jul. 17, 2007, 6 pages.

* cited by examiner

PET LITTER BOX

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of pet litter boxes. More particularly, the invention relates to a pet litter box having enhanced odor control capabilities.

TECHNOLOGY IN THE FIELD OF THE INVENTION

Domestic cats kept as pets are usually trained to use a litter box for elimination of both liquid and solid wastes. A cat litter box is normally made of a liquid impermeable material so that a cat's urine will not leak through the box. The box may optionally have a cover. The litter used in these boxes may be one of any number of particulate litter or other materials that absorb moisture from the waste of the cat. The litter material may also suppress odor from cat waste. Some forms of litter form clumps when wet. Usually, a cat will bury its solid waste in the litter material in the box. The litter box requires periodic cleaning to remove the cat's solid waste and the litter that is saturated with urine.

A problem with such litter is that it only eliminates the odor when the litter has become dry due to evaporation of the urine. However, as the litter is clumped or becomes piled up due to the cat covering the urine location, the saturated litter does not dry quickly and therefore the odor remains for an extended period of time.

A need therefore exists for an improved pet litter box which promotes the drying of litter to restrict the emission of odors.

BRIEF SUMMARY OF THE INVENTION

An improved pet litter box is provided herein. The pet litter box comprises a base portion having a floor, a pair of oppositely disposed sidewalls extending from the floor, a rear wall extending from the floor, and a front wall extending from the floor. The pet litter box also has a grid floor removably coupled to the base portion and having a plurality of grid holes extending there through, and a cover removably coupled to the base portion. Wherein the base portion includes a plurality of vents positioned about the base portion floor and below the grid floor.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Description of Selected Specific Embodiments

With reference next to the drawings, there is shown a pet litter box 10 in a preferred form of the invention. The litter box 10 includes an enclosure or housing 12 having a base portion 14, a middle or grid portion 16 configured to nest within the base portion 14, and a cover or top portion 18 configured to mesh with the base portion 14.

The base portion 14 has a floor 20 from which extends a raised, peripheral ledge 22 about three sides of the floor 20, namely the two oppositely disposed side walls 24 and the rear wall 26. The peripheral ledge 22 includes a generally vertical wall 28 which transitions to a horizontal wall 30. A pair of oppositely disposed tray guide rails 32 extend between the floor 20 and the peripheral ledge vertical wall 28. The base portion 14 also includes a front wall 34, which in combination with the rear wall 26, and two side walls 24 form a base portion top edge 36. The front wall 34, rear wall 26 and sidewalls 24 may all be considered sidewalls as they form the sides of the base portion 14.

Figure 1:
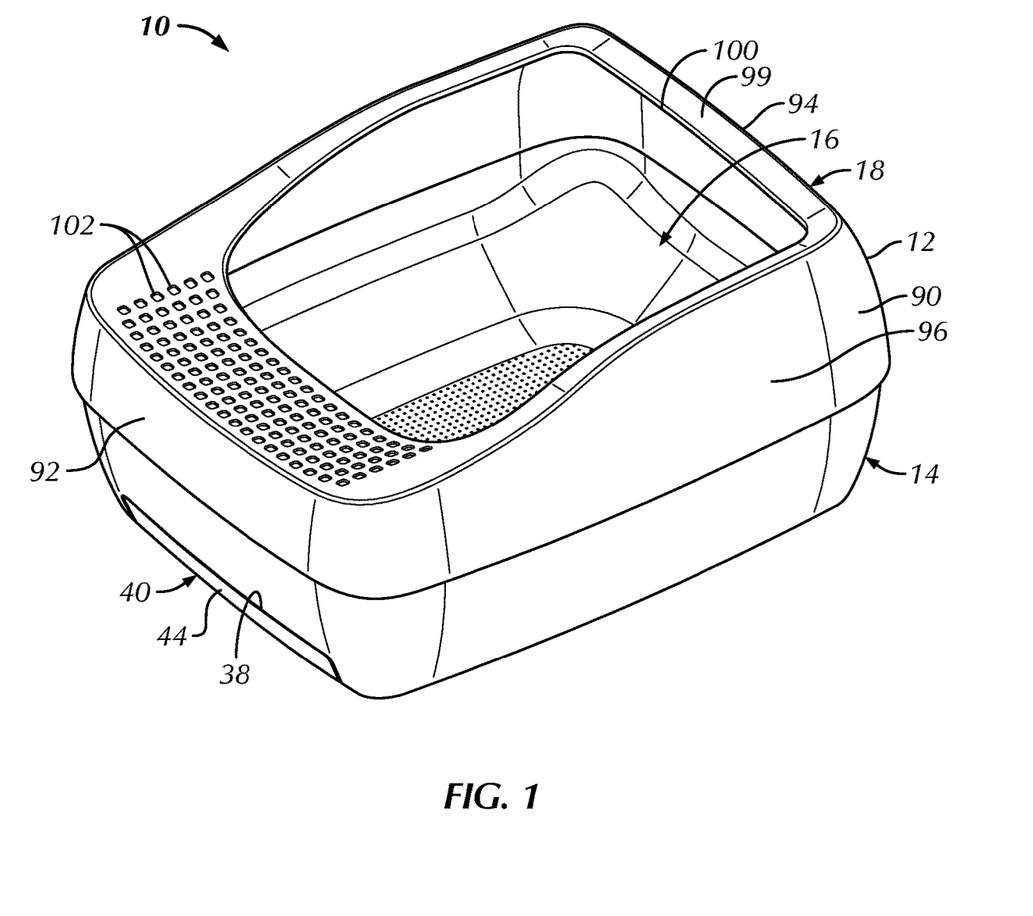
FIG. 1 is a perspective view of an illustrative pet litter box embodying principles of the invention in a preferred form.
Figure 2:
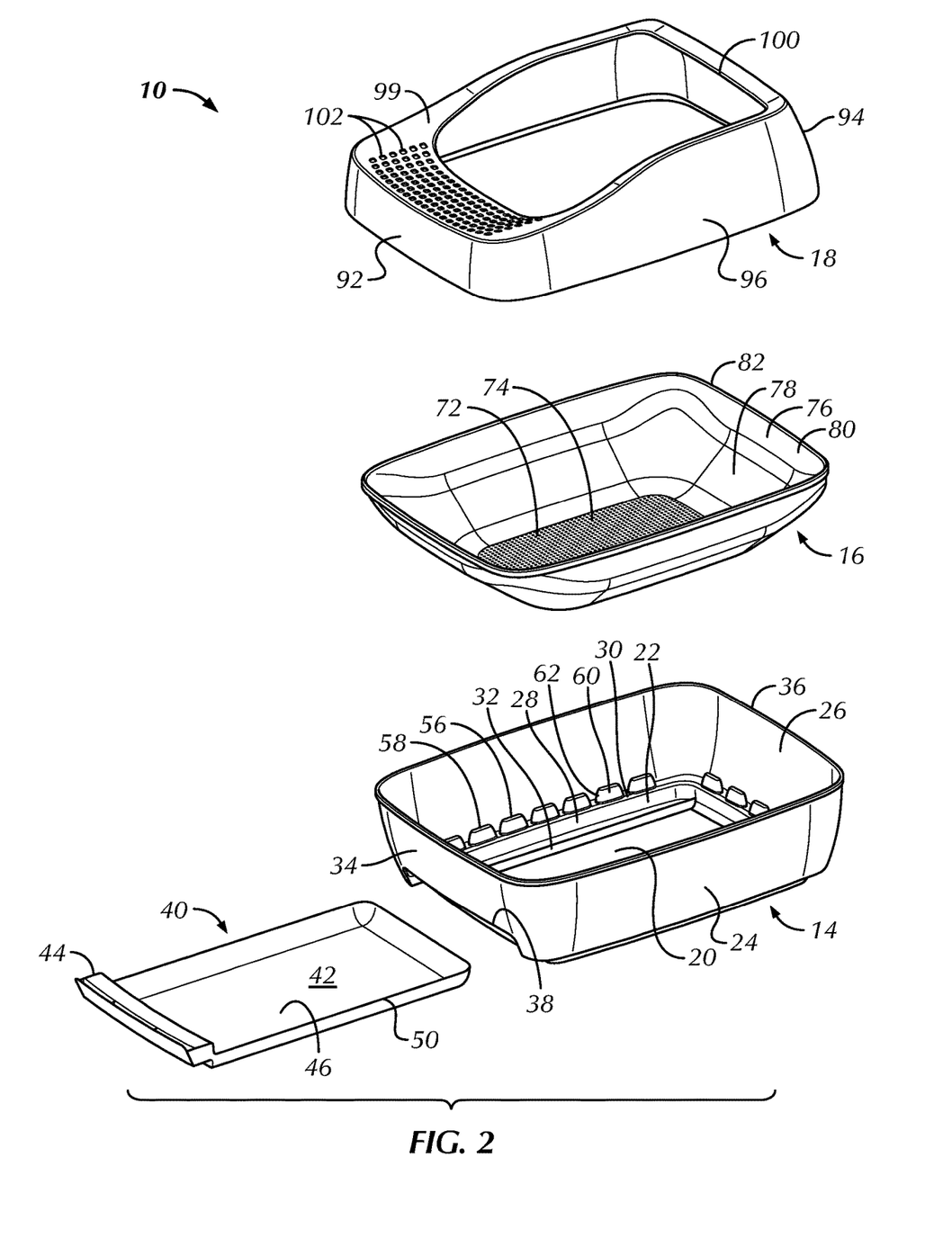
FIG. 2 is an exploded view of the pet litter box of FIG. 1.
Figure 3:
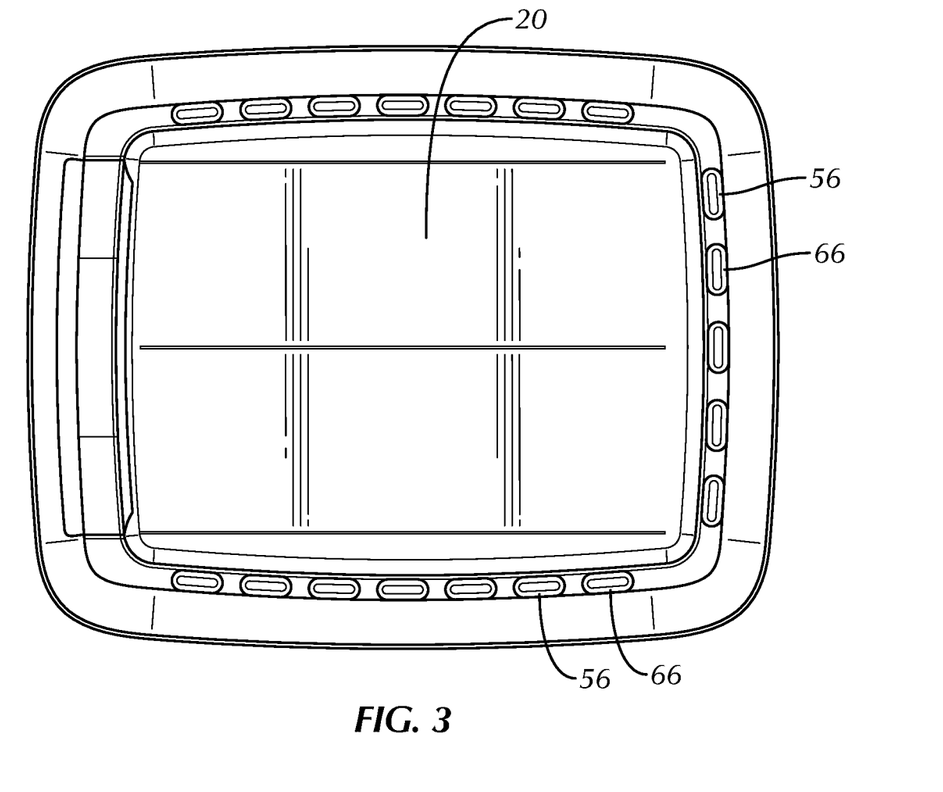
FIG. 3 is a bottom view of the pet litter box of FIG. 1.
Figure 4:
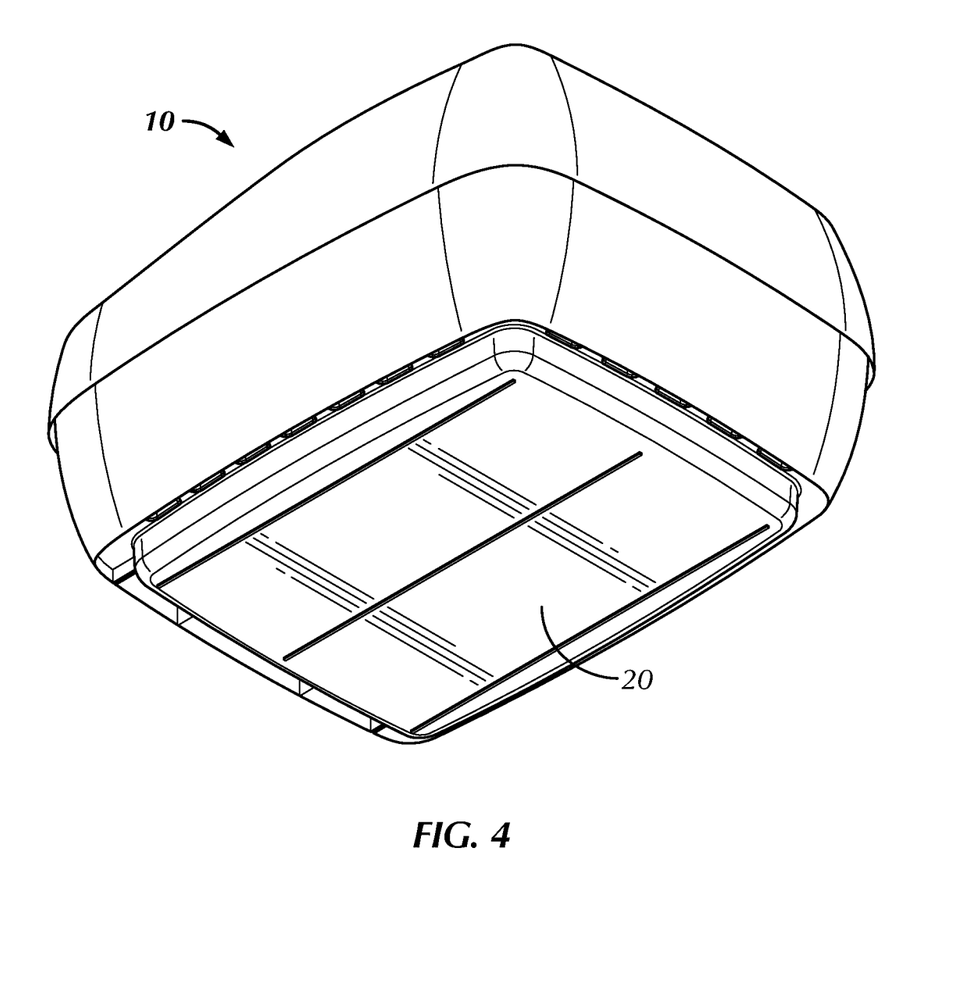
FIG. 4 is a perspective, bottom view of the pet litter box of FIG. 1.

The front wall 34 includes a tray slot 38 extending there through which is configured to receive a removable tray 40. The tray 40 is slidable upon the pair of guide rails 32 between a removed position, shown in FIG. 2, and a stowed position fully enclosed within the base portion 14. The removable tray 40 has a shallow, generally rectangular shaped basin 42 and a handle 44. The basin 42 has a flat floor 46 and a raised peripheral edge 50. The handle 44 is positioned above the basin peripheral edge 50 and is hollow with a bottom opening 52 to allow the entry of a person's finger's for gripping purposes. The tray basin 42 is configured to receive a conventional pet urine absorbent pad. The exterior surface of the handle 44 is configured to match or mesh with the exterior surface of the front wall 34 to provide a uniform appearance.

The horizontal wall 30 of the peripheral ledge 22 includes a series of air vents 56. Each air vent 56 has an upwardly extending hood 58 having a rear wall 60, two oppositely disposed end walls 62 which define an outwardly facing air exit or outlet opening 64 spaced from and facing the adjacent base portion side wall 24 or base portion rear wall 26 and facing away from the floor 20. Each air outlet opening 64 is in fluid communication with a bottom air inlet opening 66 extending through the ledge horizontal wall 30. The air inlet opening 66 is in fluid communication with ambient air external of the litter box 10. The air vents, and especially the air inlet 66 is positioned upon the raised ledge so that it is elevated above the underlying floor of the home to promote better air flow ventilation and prevent the air inlets from being blocked, which may occur if the underlying structure is carpet or the like.

The grid portion 16 has a generally flat floor 72 with a series or grid of holes 74 there through. The grid holes 74 have a diameter size of approximately 2 mm to allow the passage of urine through the grid holes 74, yet prevent or restrict the passage of conventional cat litter there through. The grid portion floor 72 extends to four sidewalls 76 each having a first portion 78 set at an angle or slope which extends to a more upright portion 80 which are configured to nest against the base portion sidewalls 24, base portion front wall 34, and base portion rear wall 26. The grid portion first portions 78 are sloped towards the grip portion floor 72 so that a mass of conventional litter may be positioned upon the grid portion 16 is gravitationally forced centrally onto the grid portion floor 72. The grid portion sidewalls 76 terminate with a outwardly extending flange or lip 82 which overlays the top edge 36 of the base portion sidewalls 24, base portion front wall 34, and base portion rear walls 26. The grid portion 16 in combination with the base portion 14 defines an air chamber 86 therebetween. Thus, the air chamber 86 is in fluid communication with the vents 56 and the grid holes 74.

The top portion 18 also includes an peripheral inner wall 90 which extends divergently from a top portion front wall 92, rear wall 94 and side walls 96 to form a peripheral space 98. The peripheral space 98 receives the lip 82 of the grid portion sidewalls 76 to maintain the position of the top portion 18 relative to both the grid portion 16 and the base portion 14. The top portion front wall 92, rear wall 94 and side walls 96 extend to a top wall 99 which defines a top opening 100.

The top wall 99 also has a matrix of holes 102 which are configured to allow the passage of conventional litter there through which may fall off the paws of a pet when exiting the litter box 10. The pet litter PL passing through the holes 102 fall back into the mass of pet litter PL positioned upon the grid portion 16.

In use, a mass of conventional pet litter PL, preferably a crystal litter, is poured onto the grid portion 16. The top portion 18 is then fitted onto the grid portion 16 with the lip 82 of the grid portion 16 residing within the peripheral space 98 of the top portion 18. A conventional urine absorption pad is also positioned upon the floor 46 of the removable tray 40 and the removable tray 40 is slid upon the guide rails 32 so that it is positioned at its stowed position.

The pet may then position itself within the opening 99 of the top portion 18 where it may then urinate upon the mass of conventional litter PL. The urine is absorbed by the pet litter PL. If any excess urine passing through the grid holes 74 in the grid portion floor 72 it will fall onto the underlying urine absorbent pad P position within the tray 40.

Figure 5:
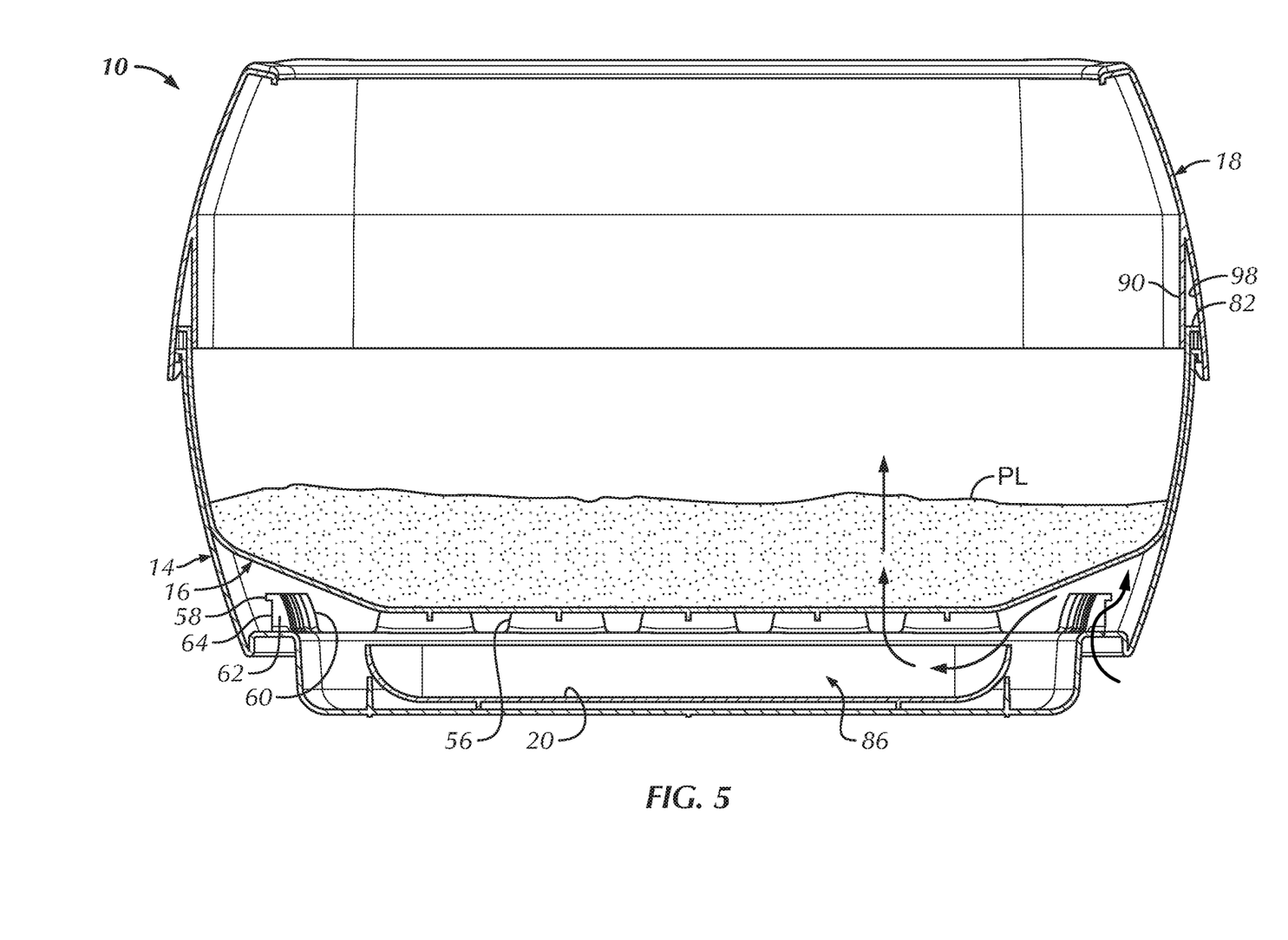
FIG. 5 is a side view of the pet litter box of FIG. 1, showing select interior structures in phantom lines.

The pet litter box 10 of the present invention promotes the drying of the pet litter PL by creating a ventilating airflow through the pet litter PL contained within the pet litter box 10. Air or an airstream enters the air chamber 86 by passing through the air inlet openings 66 of the peripheral vents 56 and exiting the peripheral vents 56 through air outlet openings 64, as indicated by the arrows in FIG. 5. The airstream then travels between the base portion 14 and tray 40 and the grid portion 16 to a position below the floor 72 of the grid portion 16. The airstream then continues through the grid holes 74 in the grid portion floor 72 and through the pet litter PL. The air passing upwardly through the pet litter PL dries the pet litter through evaporation, thereby "recharging" the pet litter so that it may absorb additional urine. The evaporation of the urine contained within the pet litter PL reduces the odor associated with the pet urine.

The vent hoods 58 are oriented so that the air outlet openings 64 face away from the pet litter PL and toward the sidewalls 24 and rear wall 26 of the base portion 14. This orientation prevents any pet litter PL or urine passing through the holes 74 in the grid portion floor 72 from splashing and entering the vents 56 and then falling onto the underlying floor of the home.

Figure 6:
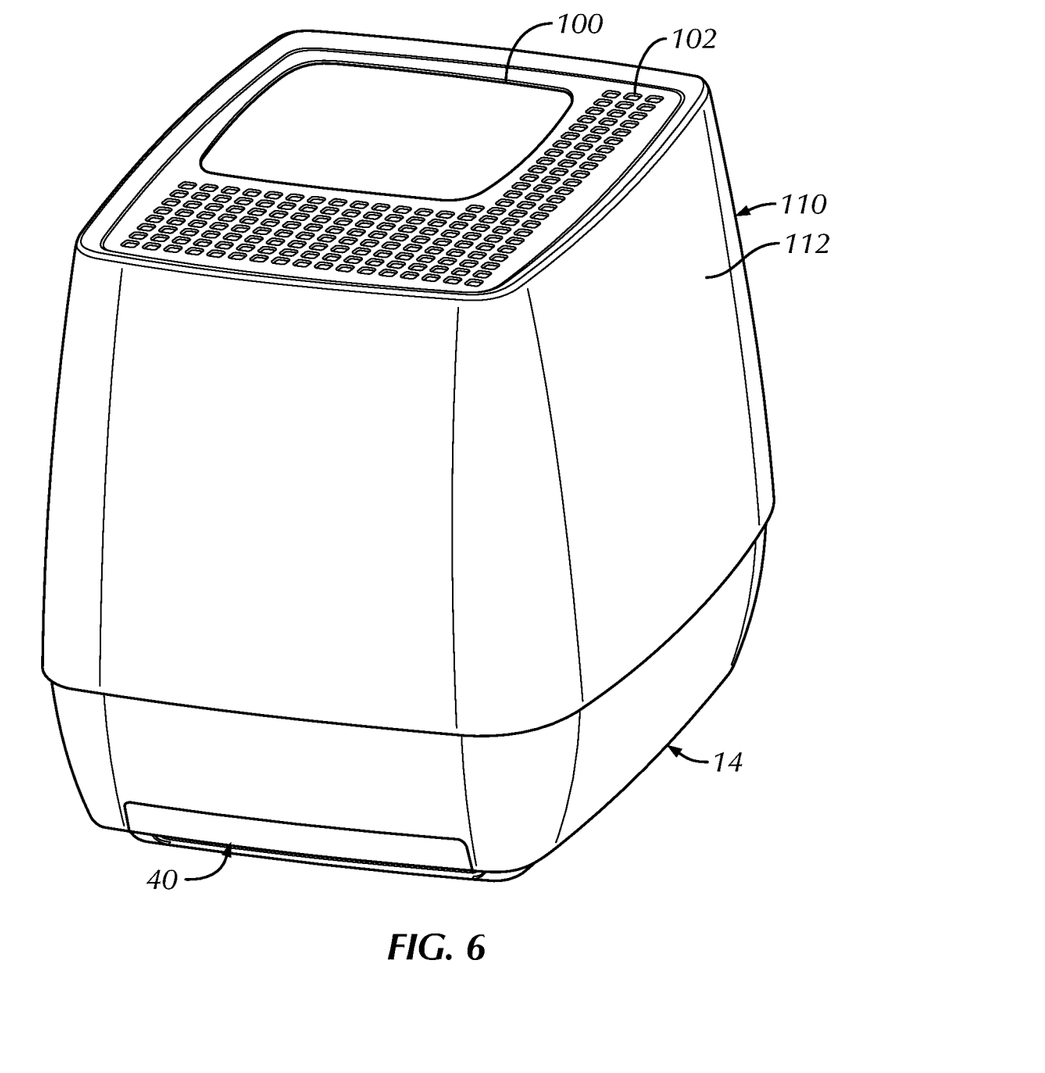
FIG. 6 is a perspective view of a pet litter box embodying principles of the invention in another preferred form.

With reference next to FIG. 6, there is shown a pet litter box in another preferred form of the present invention. Here, the litter box 110 is the same as that previously described except for the configuration of the top portion or cover 112. The top portion 112 is taller so that the cat positions itself totally within the confines of the pet litter box 110. This configuration is preferred by some cats that prefer complete seclusion.

It should be understood that the separate pieces of the pet litter box shown in the preferred embodiments may be formed as one unit, or a unit having some of these pieces formed as a single piece. For example, the base portion may be combined with the grid portion, or the grip portion may be combined with the top portion. Also, the top portion may be eliminated altogether, however, this is not preferred as the top portion aids in preventing the pet litter from being kicked out of the litter box by the pet.

A pet litter box of an embodiment is comprising a base having a floor and a plurality of sidewalls extending upwardly from said floor. The base has at least one vent extending through the base. The pet litter box also has a grid portion positioned above the base having a floor with a plurality of holes there through, and a top portion at least partially covering the grid portion and having a top opening sized and shaped to allow the passage of a pet. The combination of the base and the grid portion define an air chamber therebetween which is in fluid communication with the vent and the grid portion plurality of holes.

The pet litter box also comprises the vent including an upwardly extending hood having an air outlet facing the base sidewall closely adjacent the vent.

The pet litter box also comprises the hood including a rear wall and a pair of oppositely disposed end walls, wherein the rear wall is located distally from the base sidewall closely adjacent the vent.

The pet litter box also comprises the base including a ledge positioned above the base floor which is defined by a vertical wall extending to a horizontal wall elevated above the base floor, and wherein the vent is positioned upon the ledge horizontal wall.

The pet litter box also comprises the vent having has an air inlet extending through the ledge horizontal wall.

The pet litter box also comprises the base including a removable tray.

The pet litter box also comprises the base having a pair of guide rails extending from the base floor, and wherein the removable tray slides upon the pair of guide rails.

The pet litter box also comprises the base having a plurality of vents.

The pet litter box also comprises each vent including a vent inlet, a vent hood in fluid communication with the vent inlet, and a vent outlet defined by the vent hood.

The pet litter box also comprises the vent outlets facing way from the base floor.

It will be appreciated that the inventions are susceptible to modification, variation and change without departing from the spirit thereof.

What is claimed is:

1. A pet litter box, comprising,
a base having a base floor and a plurality of sidewalls extending upwardly from said base floor, said base having plurality of air vents extending through said base;
a grid portion positioned above said base floor, said grid portion having a grid floor with a plurality of holes there through; and
a top portion at least partially covering said grid portion, said top portion having a top opening sized and shaped to allow the passage of a pet;
wherein the combination of said base and said grid portion defines an air chamber therebetween which is in fluid communication with said plurality of air vents and said grid portion plurality of holes, wherein each said air vent of said plurality of air vents includes an upwardly extending hood having an air outlet facing said base sidewall of the plurality of sidewalls closest each said air vent, wherein said base includes a ledge positioned above said base floor, said ledge being defined by a vertical wall extending to a horizontal wall elevated above said base floor, and wherein each said air vent is positioned upon said ledge horizontal wall.

2. The pet litter box of claim 1, wherein each said hood includes a rear wall and a pair of oppositely disposed end walls, wherein said rear wall is located distally from said base sidewall of the plurality of sidewalls closest each said air vent.

3. The pet litter box of claim 2 wherein said air vent has an air inlet extending through said ledge horizontal wall, wherein each said vent hood is in fluid communication with said vent inlet.

4. The pet litter box of claim 1 wherein said base includes a removable tray.

5. The pet litter box of claim 4 wherein said base includes a pair of guide rails extending from said base floor, and wherein said removable tray slides upon said pair of guide rails.

6. A pet litter box comprising,
a base portion having a base portion floor, a pair of oppositely disposed sidewalls extending from said floor, a rear wall extending from said floor, and a front wall extending from said floor;
a grid floor removably coupled to said base portion, said grid floor having a plurality of grid holes extending there through; and
a cover removably coupled to said base portion;
wherein said base portion includes a plurality of vents positioned about said base portion floor and below said grid floor, wherein each said vent of said plurality of vents includes a hood having an outwardly facing air outlet.

7. The pet litter box of claim 6 wherein each said hood includes a rear wall and a pair of oppositely disposed end walls.

8. The pet litter box of claim 6 wherein said base portion includes a ledge positioned above said base portion floor, said ledge being defined by a vertical wall extending to a horizontal wall elevated above said base portion floor, and wherein said plurality of vents are positioned upon said ledge horizontal wall.

9. The pet litter box of claim 8 wherein each vent of said plurality of vents has an air inlet extending through said ledge horizontal wall.

10. The pet litter box of claim 6 wherein said base portion includes a removable tray.

11. The pet litter box of claim 10 wherein said base portion includes a pair of guide rails extending from said base portion floor, and wherein said removable tray slides upon said pair of guide rails.

12. A pet litter box comprising,
a housing having a base;
a pet litter support positioned within said housing, said pet litter support having a floor with a plurality of holes there through;
a plurality of air vents extending through said housing, said plurality of air vents being positioned below said pet litter support, whereby a ventilating airflow may pass through the plurality of air vents and through the holes within the pet litter support to ventilate pet litter disposed upon the pet litter support, wherein each said air vent of said plurality of air vents includes a hood having an outwardly facing air outlet.

13. The pet litter box of claim 12 wherein each said hood includes a rear wall and a pair of oppositely disposed end walls.

14. The pet litter box of claim 12 wherein said base includes a ledge positioned above a base floor, and wherein said plurality of air vents are positioned upon said ledge.

15. The pet litter box of claim 14 wherein each vent of said plurality of air vents has an air inlet extending through said ledge.

16. The pet litter box of claim 12 wherein said base includes a removable tray.

17. The pet litter box of claim 16 wherein said base includes a pair of guide rails, and wherein said removable tray slides upon said pair of guide rails.

* * * * *